June 8, 1965

E. R. McKNIGHT 3,187,912

SCOOP ASSEMBLY

Filed Jan. 7, 1963

INVENTOR.
ELMER R. McKNIGHT
BY
Moore, White & Burd
ATTORNEYS

June 8, 1965   E. R. McKNIGHT   3,187,912
SCOOP ASSEMBLY

Filed Jan. 7, 1963   6 Sheets-Sheet 3

INVENTOR.
ELMER R. McKNIGHT
BY
Moore, White & Durd
ATTORNEYS

June 8, 1965  E. R. McKNIGHT  3,187,912
SCOOP ASSEMBLY
Filed Jan. 7, 1963  6 Sheets-Sheet 4

INVENTOR.
ELMER R. McKNIGHT
BY
Moore, White & Burd
ATTORNEYS

June 8, 1965  E. R. McKNIGHT  3,187,912
SCOOP ASSEMBLY
Filed Jan. 7, 1963  6 Sheets-Sheet 6

INVENTOR.
ELMER R. McKNIGHT
BY
ATTORNEYS

1

3,187,912
SCOOP ASSEMBLY
Elmer R. McKnight, Markesan, Wis., assignor to Markesan Products Company, Minneapolis, Minn., a corporation of Minnesota
Filed Jan. 7, 1963, Ser. No. 249,888
4 Claims. (Cl. 214—140)

This invention relates to a scoop assembly of the general type adapted to be mounted in rearward extension from a tractor.

Ordinarily scoops or unloaders for farm use or the like are mounted to extend outwardly from the front of a tractor. It is well known that such assemblies employ costly and intricate mounting structure, are difficult to put on and take off, are expensive and have limited ability because of their tendency to decrease the traction of the rear or driving tractor wheels. Thus, to accomplish a front mounted scoop assembly, it is usually necessary to employ enlarged structure of burdensome size, which, besides being costly to purchase and time consuming to install, is particularly undesirable because it hinders the normal performance of the tractor due to the added weight, obstruction and lightening of rear wheel pressure on the ground. Attempts to provide simpler, less expensive, yet versatile scoop assemblies have not met with success. The need and desire to solve this problem has given rise to the present invention.

It is therefore an object of this invention to provide a scoop assembly which employs a minimum of component parts, which is ruggedly built, yet of simple and inexpensive design, and which achieves the utmost in versatility when utilized to accomplish the wide variety of tasks demanded of it, such as grading, dumping, loading, transporting or the like.

Another object of this invention is to provide a scoop assembly or the like which may be quickly and easily, yet effectively, mounted and dismounted to the rear of a commercial farm tractor, or more specifically, to the three-point hitch which such tractors commonly provide.

Yet another object of this invention is to provide a rear-mounted detachable scoop assembly which is comprised of a few strong and durable parts compositely constructed and arranged in extremely functional and structural cooperation.

A still further object of this invention is to provide a rear-mounted detachable scoop assembly which, in addition to being operatively connected to the hydraulic power means used to operate the drawbar or three point hitch assembly (associated with the rear axle assembly) of a tractor, also has an independent linkage mechanism that is hydraulically powered for positive control of the position of the bucket or scoop.

A further object of this invention is to provide a scoop assembly having an independent linkage for controlling the position of the bucket that comprises a mechanical linkage that may be placed in locked position, and which may be unlocked by a simple release means.

A further object of this invention is to provide a scoop or the like which in use increases rear wheel traction.

Further objects of this invention reside in the particular design of the bucket, the bucket frame structure, the actuating and locking means, the tractor drive connecting means and the structural cooperation therebetween, whereby there is provided an assembly which is ruggedly and powerfully built, yet which provides effective and versatile operation.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which.

Figure 1:
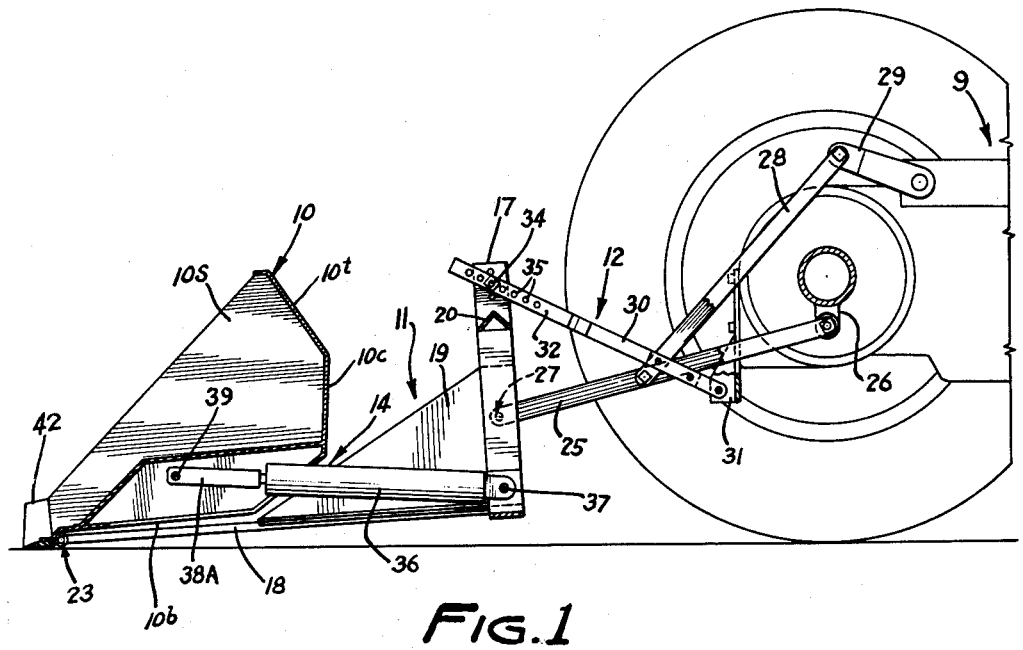
FIGURE 1 is a partly elevational, partly longitudinal section view taken on the line and in the direction of the arrows 1—1 of FIGURE 4, and showing the invention mounted on the rear end of a tractor with the bucket disposed in loading position; portions of the device are broken away, and broken lines illustrate hidden parts.

Referring now to the drawings, and particularly to FIGURES 1-5, there is shown a preferred embodiment of the scoop assembly operatively connected to the rear portion of a tractor, generally designated 9. The scoop assembly may be thought of as comprising four general parts, namely the bucket 10, the frame 11 for supporting the bucket, the connection means 12 and the control mechanism 14 between the bucket and frame. Each of these parts will now be described in greater detail.

The design and construction of the bucket 10 is such as to provide suitable capacity and durability as required for performing the various tasks associated with general farm work, such as scooping and transporting bulk materials, cleaning yards, snow removal, etc. It is preferably of all steel construction and reinforced to provide the necessary functional strength.

Figure 2:
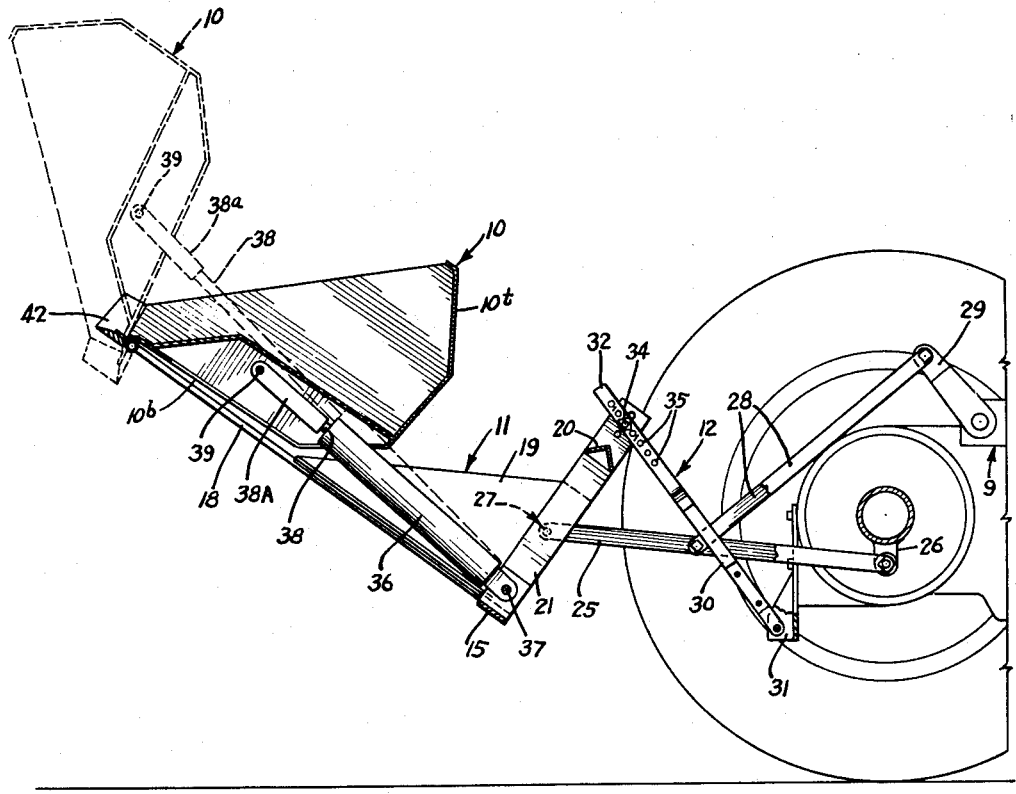
FIGURE 2 is a similar view showing, in full lines, a raised position of the bucket and frame and, in broken lines, a discharging position of the bucket; hidden parts are shown with dotted lines.

Bucket 10 is formed from a pair of side panels 10S of the configuration shown and a connecting sheet member or wrapper 10C. Each of the side panels is an irregular polygon having three short sides and two long sides. One of the long sides of panels 10S extends along the bottom 10B of the scoop. Sheet metal member 10C is formed to and joined to the contours of the panels 10S except for one long side of each panel 10S. This formed sheet metal member 10C is connected to the edges of the side panels suitably as by welding and forms the bottom and rear of the scoop. A portion of sheet 10C extends forwardly as at 10T and overlies a portion of the scoop when it is positioned as shown in FIGURE 1. Portion 10T extends approximately vertically when the scoop is positioned as shown in FIGURE 2 so that substanial loads may be carried by the scoop 10. It will be noted that scoop 10 is shown as formed entirely by members having straight edges. Scraper edge 42 is offset down from bottom 10B of scoop 10 to allow members 18 to extend under scoop 10 to pivots 23–24 without preventing blade 42 from engaging a ground surface directly when loading, as in FIGURE 1. Pivots 23–24 are positioned at the offset and are formed as spaced sleeves welded to the offset portion of the scoop. Between these sleeves is interposed third sleeves 23a, secured to arms 18. Rods 23b are passed through all three sleeves and retained in position by securing means such as cotter keys at each end.

Figure 4:
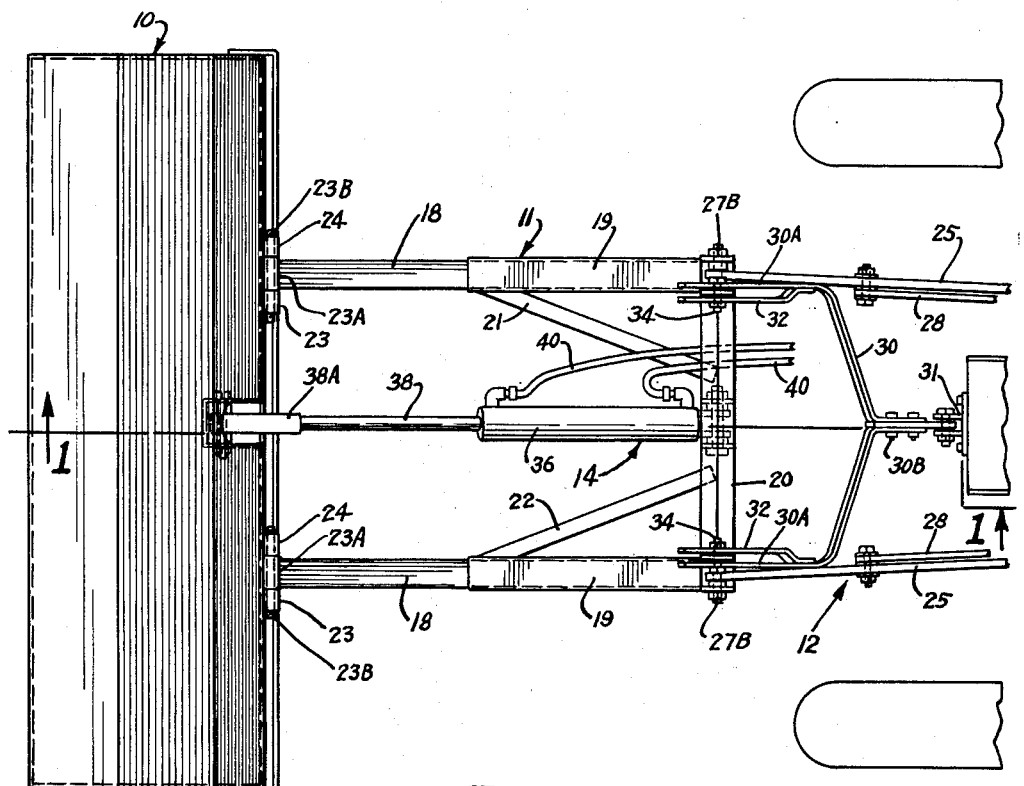
FIGURE 4 is a plan view of the assembly taken on the line and in the direction of the arrows 4—4 of FIGURE 3; broken lines show hidden parts.
Figure 5:
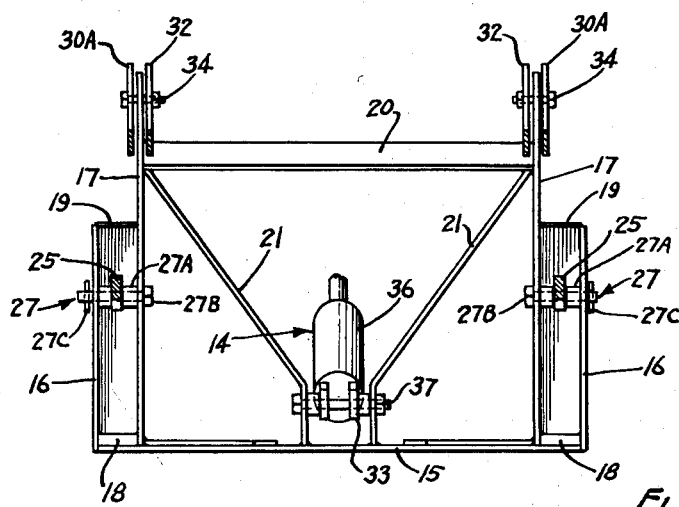
FIGURE 5 is an end view of the scoop asembly frame taken on the line and in the direction of the arrows 5—5 of FIGURE 3; broken lines show hidden parts.

The construction of the frame for supporting the bucket is best shown in FIGURES 4 and 5. It includes a transverse base member 15 to which, at its ends, are rigidly secured upright end members 16. A pair of lengthened upright members 17 which extend parallel with end members 16 but are disposed inwardly in relation thereto are also rigidly secured to base member 15. Bucket support arms 18 extend longitudinally in parallel spaced relation from each end of member 15, and a pair of triangularly shaped panel channels 19A and 19B fixed to each of the members 18 and their corresponding uprights 16 and 17, establish a rigid connection between these members in a longitudinal vertical plane.

Tie bar 20, preferably an angle iron, interconnects the members 17 as shown. Tie bar 20, in cooperation with diagonal braces 21 which are secured generally diagonally between members 17 and the transverse base member 15, provides rigidity in the frame in a transverse vertical plane. Rigidity in a horizontal plane is provided by the angularly extending members 22 which are fixed between the base member 15 and each of the side members 18.

The panel channels 19, in addition to providing reinforcement, also add to the over-all eye appeal of the assembly as their edges abut with the members 16, 17 and 18 of the frame, whereby a structure is achieved that both looks and is unified.

At the outer ends of the bucket support arms 18 are the sleeves 23A which are interposed between the spaced sleeves 23 and 24 as described to provide means for pivotally supporting the bucket near its leading edge.

The connection means or linkage 12 for securing the frame in operative cooperation with tractor 9, includes a pair of rearwardly extending bar means 25, FIGURES 1, 2, 3, 4 and 5, which interconnects to bosses 26 at each side of the axle assembly of the tractor 9 to a pin sleeve connection, generally designated 27, on frame 11. The pin sleeve connection 27 comprises a split sleeve 27A having a transverse bore therein and being interposedly situated between are upright members 16 and 17 of the frame as shown in FIGURE 5. Uprights 16 and 17 and the bars 25 are apertured and receive the pins 27B to form a pivotal connection. Cotter pins 27C secure pins 27B.

Each of the bars 25 is connected near its mid-point to the power driven bars 28, which in turn connect to the power cranks 29 of the hydraulic means of the tractor. Thus, power is transmitted to the frame 11 of the scoop assembly from the cranks 29, through bars 28 and 25, in that order.

Frame 11 is also secured by a Y-shaped member 30 having straight leg sections 30A and a tie section 30B which is pin connected to the central hitch 31 of the tractor. The Y-member 30 is thus pivotally secured to the hitch and extends upwardly at an angle therefrom to be connected as shown to the upright members 17 of the frame. This connection to the frame is accomplished by offset members 32 secured to each of the leg sections 30A of Y-member 30, whereby the upper end of the upright members 17 may be engaged therebetween. A pivotal connection is achieved by boring these elements in registry to receive suitable bolt fasteners 34. A series of apertures 35 are provided in the legs 30A and 32 of the Y-member 30 to enable adjustment thereof relative to the frame, as shown in FIGURES 1, 2 and 3.

The bucket control mechanism 14 between the frame 11 and the bucket 10 in the preferred embodiment consists of a hydraulic power cylinder 36 which is pivotally supported on frame 11 by means of a bolt fastener 37 extending through holes in the generally diagonal braces 21 and pierced ears 33 on the butt end of cylinder 36. Ram 38 of the hydraulic cylinder has an enlarged portion 38A with a transverse bore therein which receives pin connector 39 that is in turn welded to the bucket 10 thus forming a pivotal connection between the ram and the bucket. Flexible conduits 40, shown in part, which conduct hydraulic fluid to and from the cylinder 36, are in communication with a source of hydraulic fluid under pressure commonly provided on the tractor via a conventional control (not shown) within reach of the driver.

Figure 3:
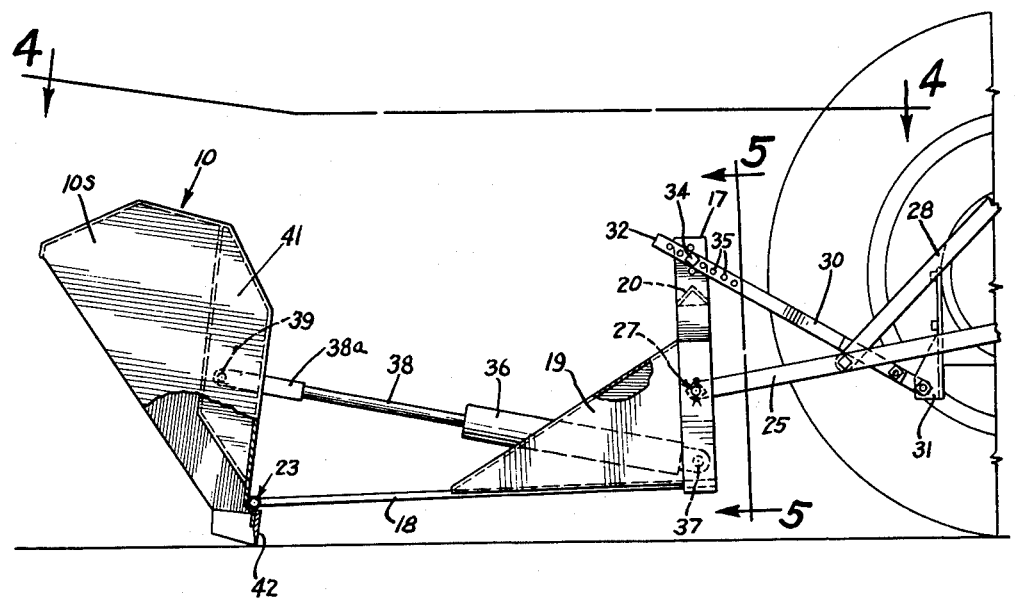
FIGURE 3 is a side elevation, partly broken away, showing the blade of the bucket engaging the ground with hidden parts shown in broken lines.

A central compartment 41 of the shape shown in FIGURE 3 is fabricated into the bucket to provide space for the hydraulic cylinder when the bucket assumes its retracted position, or the full line position of FIGURES 1 and 2.

In operation the scoop assembly of FIGURES 1–5 is capable of performing a wide variety of tasks as is self-evident by the structural and functional cooperation of the elements of the assembly with those of the tractor. Thus, power to raise and lower the frame and bucket compositely is derived from the hydraulic cranks 29 of the tractor as transmitted to the drive connection means 12. Positive control of the positioning of the bucket relative to the frame is achieved by actuation of the hydraulic cylinder 36 as desired. Thus, as is apparent from the drawings, the scoop assembly may be utilized for scooping, as in FIGURE 1, or scraping, as in FIGURE 3, or as in FIGURE 2, for transporting and dumping bulk materials such as grain, feed, shavings, sand, snow, etc. In performing all of these various tasks, the scoop assembly of the present invention has been highly effective and versatile. For example, the scoop assembly may be used as a scraper or drag for cleaning or leveling yards by merely actuating the power cylinder to position the bucket and the hardened steel scraper edge 42 as shown in FIGURE 3.

Figure 6:
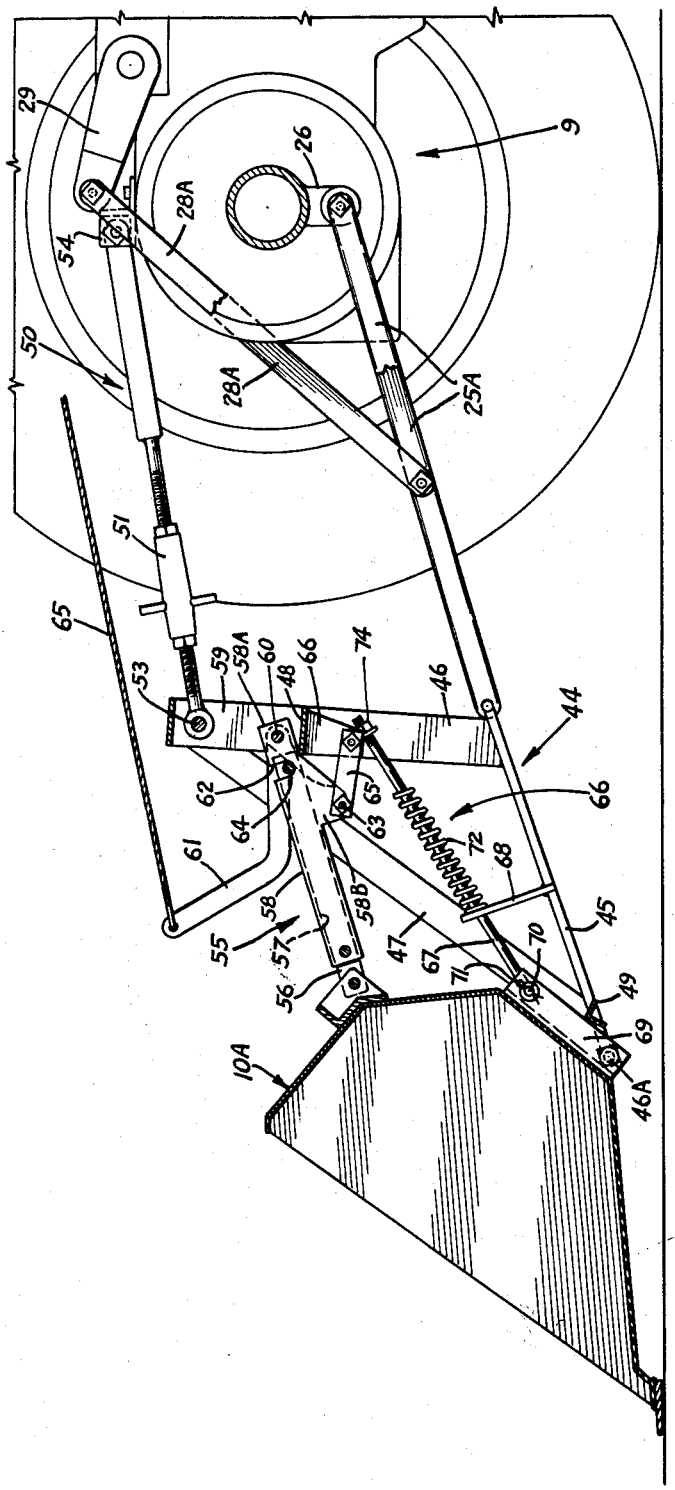
FIGURE 6 is an enlarged view similar to FIGURE 1 of a modified construction taken on the line and in the direction of the arrows 6—6 of FIGURE 8 but showing the bucket in loading position on the lowered frame; broken lines show hidden parts.
Figure 7:
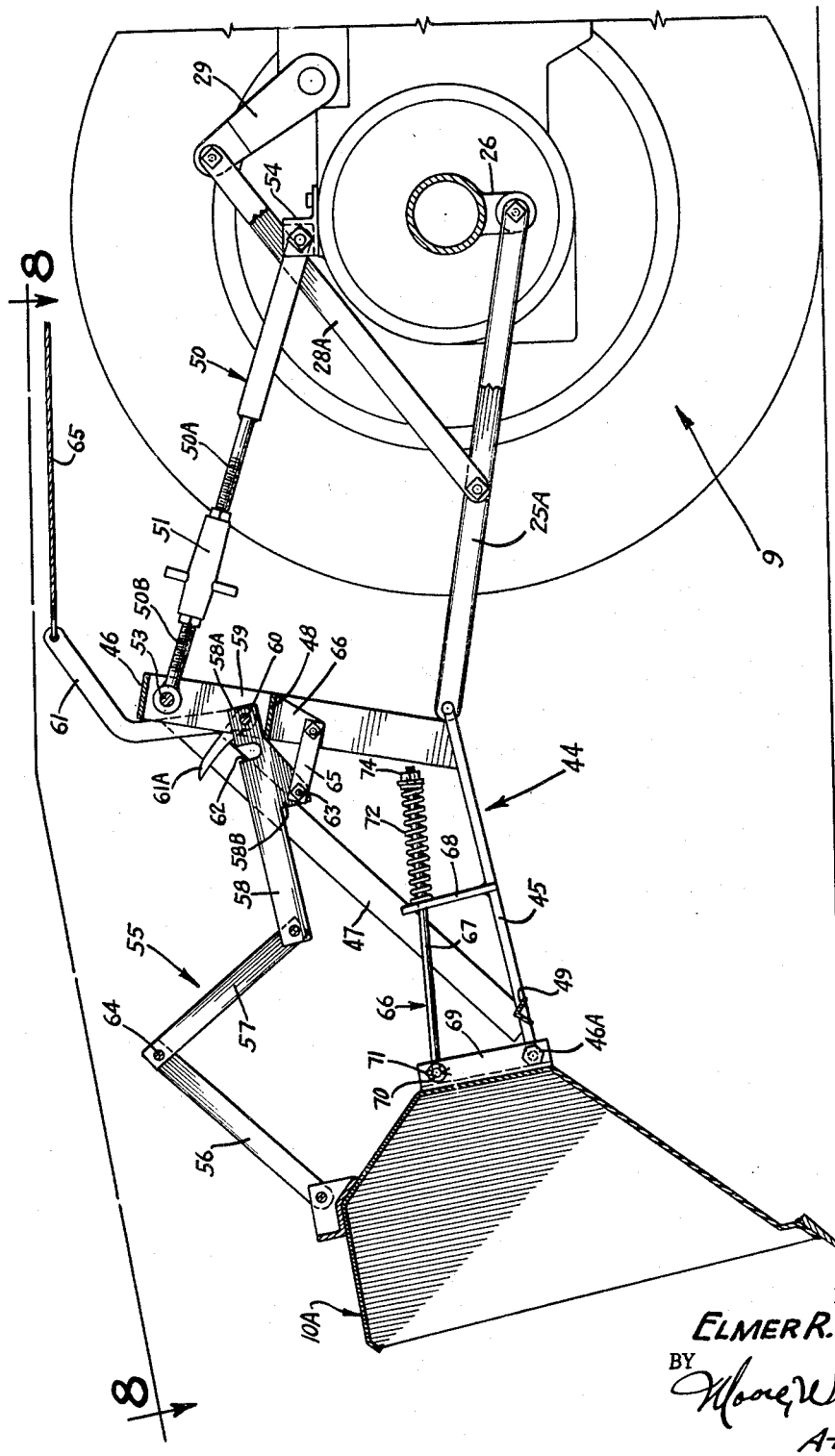
FIGURE 7 is similar to FIGURE 6 showing the scoop assembly of that figure in partly raised position with the bucket of the assembly actuated to discharge its load; broken lines show hidden parts.
Figure 8:
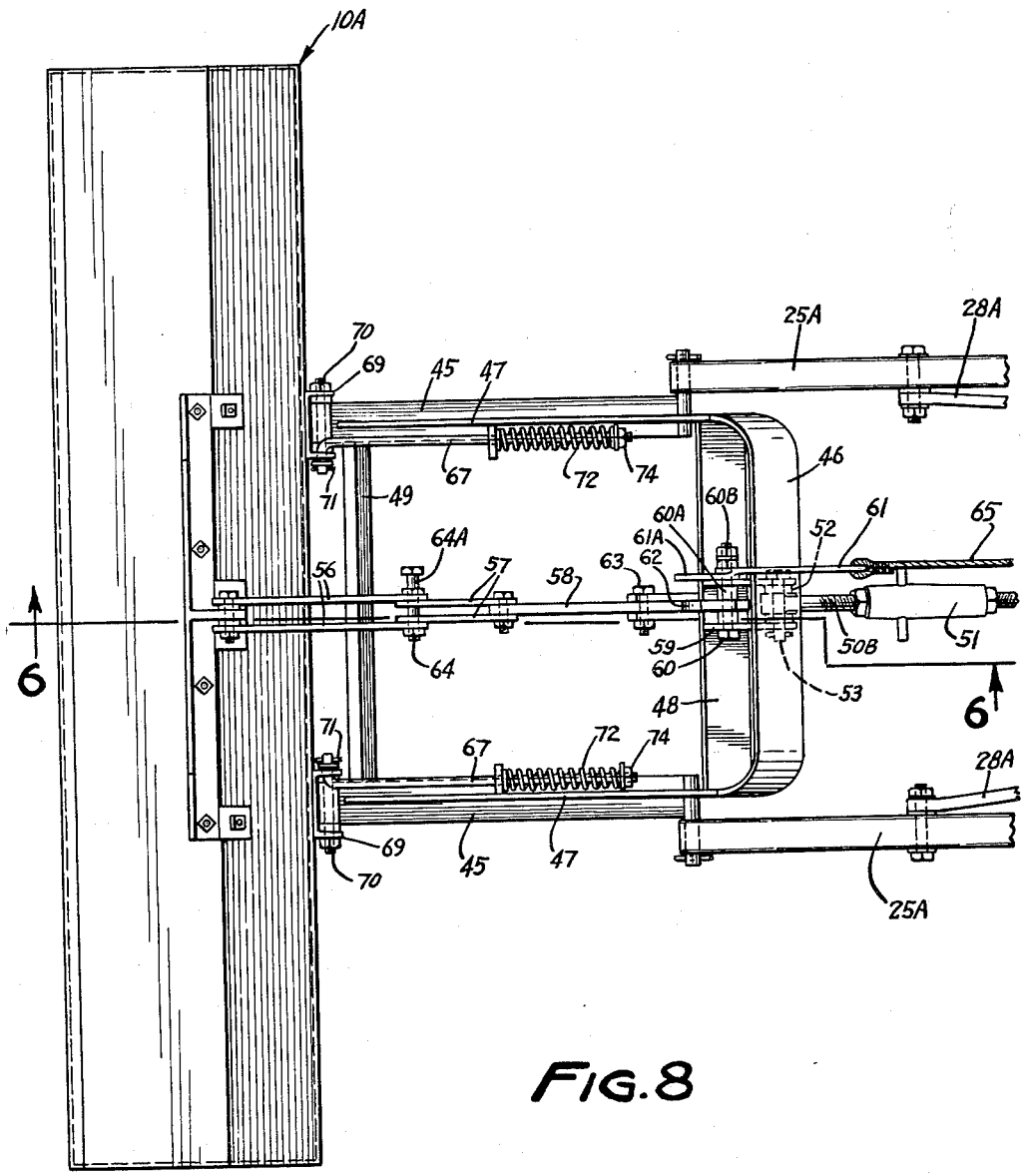
FIGURE 8 is a plan view of the assembly of FIGURES 6 and 7 taken on the line and in the direction of the arrows 8—8 of FIGURE 7 with hidden parts appearing in broken lines.

Referring now to the modified structure of FIGURES 6–8, there is shown the scoop assemby with mechanical means being substituted for the hydraulically actuated linkage or bucket control mechanism of the preferred embodiment. Also, the structure of the frame and the manner in which it is interconnected to the tractor and bucket have been modified. Only the modified structure will be assigned new numerals, and described in detail.

The frame of the present embodiment, generally designated 44, includes a pair of base members 45 which are in spaced parallel relation and which have tubular ends which are suitably secured to the bucket 10A by pin and sleeve connections 46A maintained in position by cotter keys at each end. Welded laterally to the base members 45 and in upward angular relation thereto is U-shaped member 46, which is rigidly secured to the base members 45 at the ends of the arms of the U-shaped member and by brace members 47. Members 47 are secured to members 45 and 46 to form an obtuse triangular configuration as shown in FIGURE 7.

Transverse flat member 48 is secured at its ends to the inner sides of the arms of member 46 to provide bracing near the vertical center of member 46. An angle iron 49 is interposedly welded between the base members 45 for further reinforcement.

Bar means 25A and 28A correspond to elements 25 and 28 in FIGURES 1–5 and connect frame 44 to the axle bosses 26 and hydraulic cranks 29 respectively of the tractor 9. In addition to this structure for interconnecting tractor 9 and frame 44, there is also provided an adjustable bar member 50, having threaded portions 50A and 50B which are received by an internally threaded turnbuckle 51, thereby providing simple and convenient means for adjusting the length of the bar and hence the positioning of the frame as necessary. Bar member 50 is pivotally secured to the U-member 46 by apertured bosses 52 provided in plates 59 and adapted to receive a suitable pin fastener 53, maintained in position by cotter keys at its ends. The opposite end of the bar member 50 is similarly bolted to a centrally disposed boss 54 provided on the top of the axle housing of tractor 9.

The mechanical linkage, generally indicated at 55, which exists between the bucket 10 and the U-shaped member 46 of the frame, comprises a pivoted three bar linkage means with its first and second segments 56 and 57 respectively, being movable, and its third segment 58 being rigidly secured to member 46 of the frame. Segment 58 is a single rather thick member and of the configuration as shown and is provided with an apertured end portion 58A which is inserted between a pair of laterally spaced plates 59 that are welded to and between the upper surface of flat member 48 and the inside top of member 46 of the frame. Plates 59 are apertured in registry with end 58A to receive bolt assembly 60 which includes spacer washers 60A and lock nuts 60B. Segments 56 and 57 are preferably provided as spaced parallel bars that when folded can extend on both sides of segment 58 as shown in FIGURE 8.

A release lever 61, the function of which will be subsequently described, is apertured at its lower end portion to also receive the bolt assembly 60 as shown. The lock nuts 60B are threaded onto the bolt and locked to sufficiently secure segment 58 of the linkage, yet allow pivotal movement of the release lever 61.

Segment 58 is shown having a notch 62 therein which is adapted to receive the central portion of pin 64 which interconnects the movable segments 56 and 57. The mechanical linkage thus provided is capable of being folded over or jack-knifed into the position of FIGURE 6 to accomplish an over-the-center locking of the pin 64 into the notch 62, whereupon the bucket of the scoop assembly is in its normal locked position.

Segment 58 of the linkage is held rigidly relative to the frame by brace plates 65 interconnected between the ears 66 rigidly secured to the bottom of member 48 and the lower portion 58B of segment 58 at 63 as illustrated in FIGURES 6 and 7. Thus plates 65 and portions of segment 58 and frame member 46 form triangles which are rigid forms, so that element 58 is fixedly positioned relative to U-shaped member 46.

To release the bucket from its locked position as when dumping, the release lever 61 is pivoted as shown in FIGURE 7. Lever 61 includes, as an integral part thereof, a finger-like projection 61A, which, in its normal position, engages the underside of an extended portion 64A of the connection pin 64. When lever 61 is pivoted from the position shown in FIGURE 6 to that shown in FIGURE 7 in any suitable manner as by a pull upon cable 65, the element 64A, if in notch 62, is caused to be lifted upwardly and out of the notch, thereby releasing the jack-knifed linkage and the bucket connected thereto.

A shock absorbing means is included in the form of the structure shown in FIGURES 6–8 to limit the jolt applied to the frame and linkage when the bucket is dumped. This shock absorbing structure includes a pair of spring biasing means 66 located on each side of the frame and mounted on the elongated bars 67 which are received through apertures in brace supports 68 in the manner as shown. The bars 67 are connected to the flange sections of channel members 69 which are welded or otherwise secured to the bucket. Bars 67 are provided with L-shaped end portions or sleeves 70 through which pins are passed that engage apertures in the flange sections of channel 60 and are secured thereto by cotter pins 71 at each end, similar to the fashion in which connections 46A secure members 45 to the bucket. Coil springs 72 are interposedly situated between the brace members 68 and end nuts 74 threaded to the elongated bars 67. A suitable coil spring of proper length and spring action is selected so that when the bucket is pivoted to its fully tipped position the spring will sufficiently restrain the bucket to prevent excessive jolting or the like.

It is apparent that many modifications and variations of this invention as hereinbefore set forth may be made without departing from the spirit and scope thereof. The specific embodiments are given by way of example only and the invention is limited only by the terms of the appended claims.

What is claimed:

1. A scoop assembly adapted to be detachably mounted in rearward extension from a tractor comprising, a frame, a bucket having a scraper edge near which said bucket is pivoted to said frame, first bar means pivotally connected to said frame and adapted to be pivotally secured to a tractor rear axle assembly, second bar means pivotally connected to said first bar means and adapted to be secured pivotally to a tractor hydraulic power means, third bar means pivotally secured to said frame and adapted to be pivotally secured to the rear axle assembly of a tractor and a bucket control mechanism that can be lengthened and shortened and interconnected between said frame and said bucket; said first and third bar means crossing each other when said scoop assembly is secured to a tractor, said first bar means being secured to a lower point on said frame than said third bar means.

2. A scoop assembly according to claim 1 further characterized in that said bucket control mechanism is a hydraulic power means.

3. A scoop structure comprising a frame, a bucket having a scraping edge near which said bucket is pivoted to said frame, pivoting control means secured to said bucket and said frame, a member pivoted to said frame at one end and adapted at its other end to be pivoted to a tractor rear axle assembly, a connecting member pivoted to said member intermediate of its ends and having a free end, said free end adapted to be pivotally secured to the drawbar hydraulic power means of a tractor, and an elongated member having longitudinally spaced connecting structure formed adjacent one end selectively and pivotally secured to said frame in spaced relation to the point of pivotal attachment thereto of said member, said elongated member adapted at its other end for pivotal attachment to a tractor rear axle assembly at a lower point thereon than said connecting member.

4. The scoop structure of claim 3 in which said longitudinally spaced connecting structure are openings, a cooperating opening in said frame and removable pin means extending through said frame opening and a selected one of said elongated member openings.

References Cited by the Examiner

UNITED STATES PATENTS

| 2,254,292 | 9/41 | Jones | 214—140 |
|---|---|---|---|
| 2,364,121 | 12/44 | Arps | 214—140 |
| 2,543,496 | 2/51 | Holopainen | 214—140 |
| 2,788,138 | 4/57 | Stueland | 214—140 |
| 2,812,083 | 11/57 | Meldohl | 214—140 |
| 2,868,399 | 1/59 | Fortier | 214—140 |

FOREIGN PATENTS 729,416  5/55  Great Britain.

HUGO O. SCHULZ, *Primary Examiner.*